US005373323A

United States Patent [19]

Kwon

[11] Patent Number: 5,373,323

[45] Date of Patent: Dec. 13, 1994

[54] INTERLACED TO NON-INTERLACED SCAN CONVERTER WITH REDUCED BUFFER MEMORY

[75] Inventor: Oh-Sang Kwon, Seoul, Rep. of Korea

[73] Assignee: Daewoo Electronics Co., Ltd., Seoul, Rep. of Korea

[21] Appl. No.: 145,500

[22] Filed: Nov. 1, 1993

[30] Foreign Application Priority Data

Oct. 29, 1992 [KR] Rep. of Korea .................... 92-20080

[51] Int. Cl.[5] .................................................. H04N 7/01

[52] U.S. Cl. ...................................... 348/448; 348/718

[58] Field of Search ................. 358/140, 160, 180, 11; 348/448, 715, 718; H04N 7/01

[56] References Cited

U.S. PATENT DOCUMENTS 4,698,674 10/1987 Bloom ................................ 358/140
4,703,353 10/1987 David ................................. 358/140
4,994,912 2/1991 Lumelsky et al. .................. 358/140

*Primary Examiner*—Victor R. Kostak
*Attorney, Agent, or Firm*—William F. Pinsak

[57] ABSTRACT

A data converter for converting interlaced image data into a non-interlaced format is disclosed. The converter comprises a buffer memory capable of storing upto N such scan lines of the interlaced image data for performing, per input pixel clock pulse, a read and then a write operation, wherein the N represents the number of scan lines per field; a horizontal address generator for, upon receiving each of input pixel clock pulses, generating a horizontal address by sequentially counting the number of pixel clock pulses received after each of input H/SYNC pulses received; and a vertical address generator for generating, upon receiving each of the input H/SYNC pulses, generating one of a series of vertical addresses for outputting the interlaced image data in the non-interlaced format.

2 Claims, 4 Drawing Sheets

INTERLACED TO NON-INTERLACED SCAN CONVERTER WITH REDUCED BUFFER MEMORY

FIELD OF THE INVENTION

The present invention relates to a scan line converter; and, more particularly, to an image data scan line converter capable of converting digitized interlaced image data from an image data source into a non-interlaced form with a reduced buffer memory.

Description of the Prior Art

Among the known methods for scanning image data comprising a plurality of successive frames, each of the frames including an even and an odd fields of video information, the so-called interlaced scan and non-interlaced scan methods are most widely accepted in the relevant industry. In the interlaced scan method, each frame of image data is scanned twice, once for odd-numbered horizontal lines of the frame and another time for even-numbered horizontal lines of the frame, so as to provide all of the horizontal lines from the odd field followed by all of the horizontal lines from the even field. On the other hand, in the non-interlaced or "progressive" scan method, each frame of image data is scanned once from the top horizontal line to the bottom horizontal line without any jumping.

In a normal operation, a television camera scans each frame of image data in the interlaced manner. FIG. 1 illustrates a sequential output from the camera, with each dot representing one pixel value in each scan line. Thus, the camera outputs data on the odd numbered scan lines (i.e., 1,3,5, . . . , N, wherein N represents the highest numbered odd line) followed by data on the even numbered horizontal lines (i.e., 2,4,6, . . . , M, wherein M represents the highest numbered even line). In modern digital image processing applications such as high definition television signal transmission, machine vision, etc., the camera output is digitized and transmitted to the digital image processor for subsequent processing.

However, this separation of image data along the vertical direction may lead to difficulties and/or inefficiencies when such vertically adjacent pixel values need be mathematically or otherwise manipulated for, e.g., filtering or transformation. Sometimes, therefore, it becomes necessary to convert digitized interlaced image data to a non-interlaced form for processing in a digital image processor.

Known systems for converting interlaced image data to a non-interlaced form include those disclosed in U.S. Pat. No. 4,885,787 issued to Okamoto et al. and U.S. Pat. No. 4,698,674 issued to Bloom. In Okamoto et al., interlace type digital video signals are converted to a non-interlace type pixel data stream by employing a scheme wherein two frame memories are alternately switched in accordance with the frame period and input pixel data are written in every other line in one frame memory while stored pixel data are read out in a non-interlaced manner from the other frame memory, and vice versa. In the Bloom patent, there is disclosed a data converter for converting interlaced formatted image data into a non-interlaced format wherein a conversion circuitry is connected between an image data source and a memory under the control of a central processing unit for controlling the generation of memory addresses to control the storage of the image data in the memory in a interlaced/non-interlaced format or to read out the image data from the memory in either an interlaced or a non-interlaced format.

While such conventional scan converters are capable of converting interlaced image data to non-interlaced data, they require a storage device capable of storing, at least, two full frames of image data, calling for an expensive and bulky system. The problem becomes even more serious as the frame size becomes larger. Therefore, there exists a need for an improved scan converter which is desirable in terms of lower cost and space requirements, and which is also relatively immune to the size expansion of the frame.

SUMMARY OF THE INVENTION

Therefore, it is a primary object of the present invention to provide an image data scan line converter which can convert digitized interlaced image data from an image data source, e.g., a television camera, to non-interlaced image data with a reduced buffer memory having a capacity of storing half a frame of image data.

In accordance with the present invention, there is provided a data converter supplied with successive scan lines of interlaced image data, pixel clock pulses and H/SYNC pulses for converting said interlaced image data in a non-interlaced format, said interlaced image data including a plurality of successive frames, each of the frames having an odd field followed by an even field, each of said scan lines including a predetermined number of pixels, said pixel clock pulses having a period corresponding to that of the pixels, each of said H/SYNC pulses announcing the beginning of the corresponding scan line of said interlaced image data, said converter comprising: a buffer memory capable of storing up to N such scan lines of said interlaced image data for performing, per pixel clock pulse, a read and then a write operation, wherein said N represents the number of scan lines per field; a horizontal address generator for, upon receiving each of said pixel clock pulses, generating a horizontal address by sequentially counting the number of pixel clock pulses received after each of said H/SYNC pulses received; and a vertical address generator for generating, upon receiving each of said H/SYNC pulses, generating one of a series of vertical addresses for outputting the interlaced image data in the non-interlaced format.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
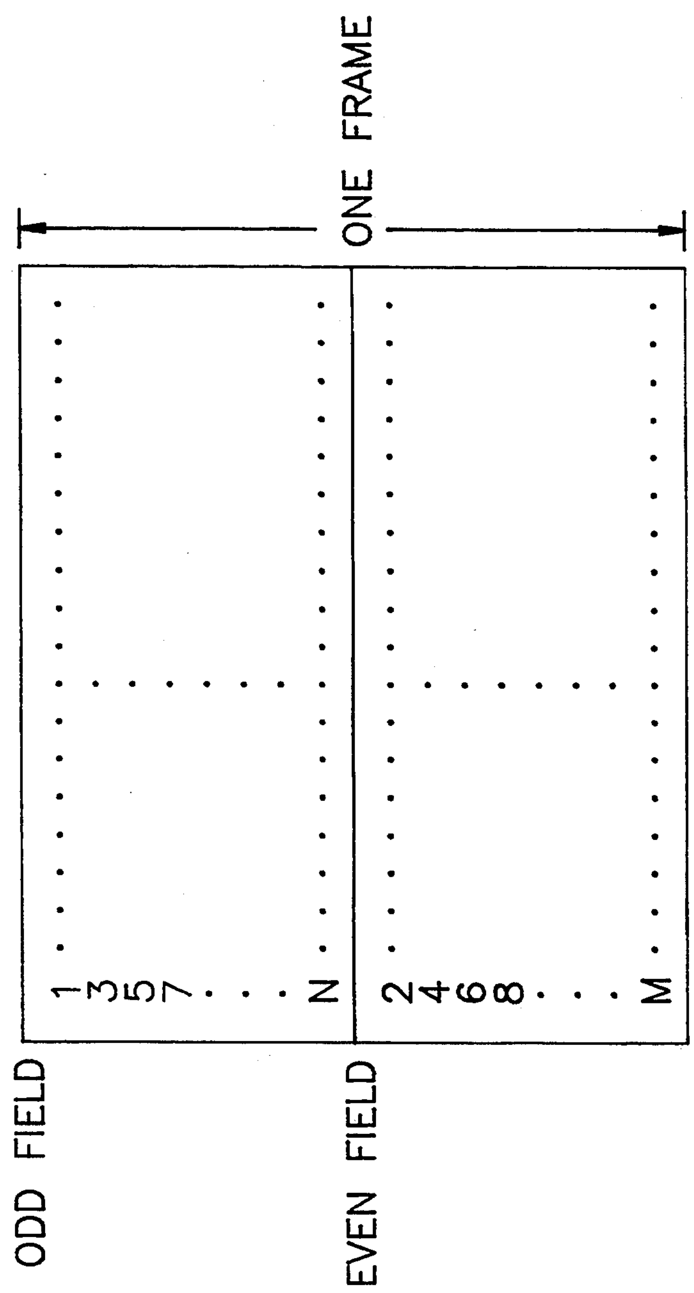
FIG. 1 is a representation of a standard frame of interlaced image data as it is outputted from a television camera in an odd and an even fields.
Figure 2:
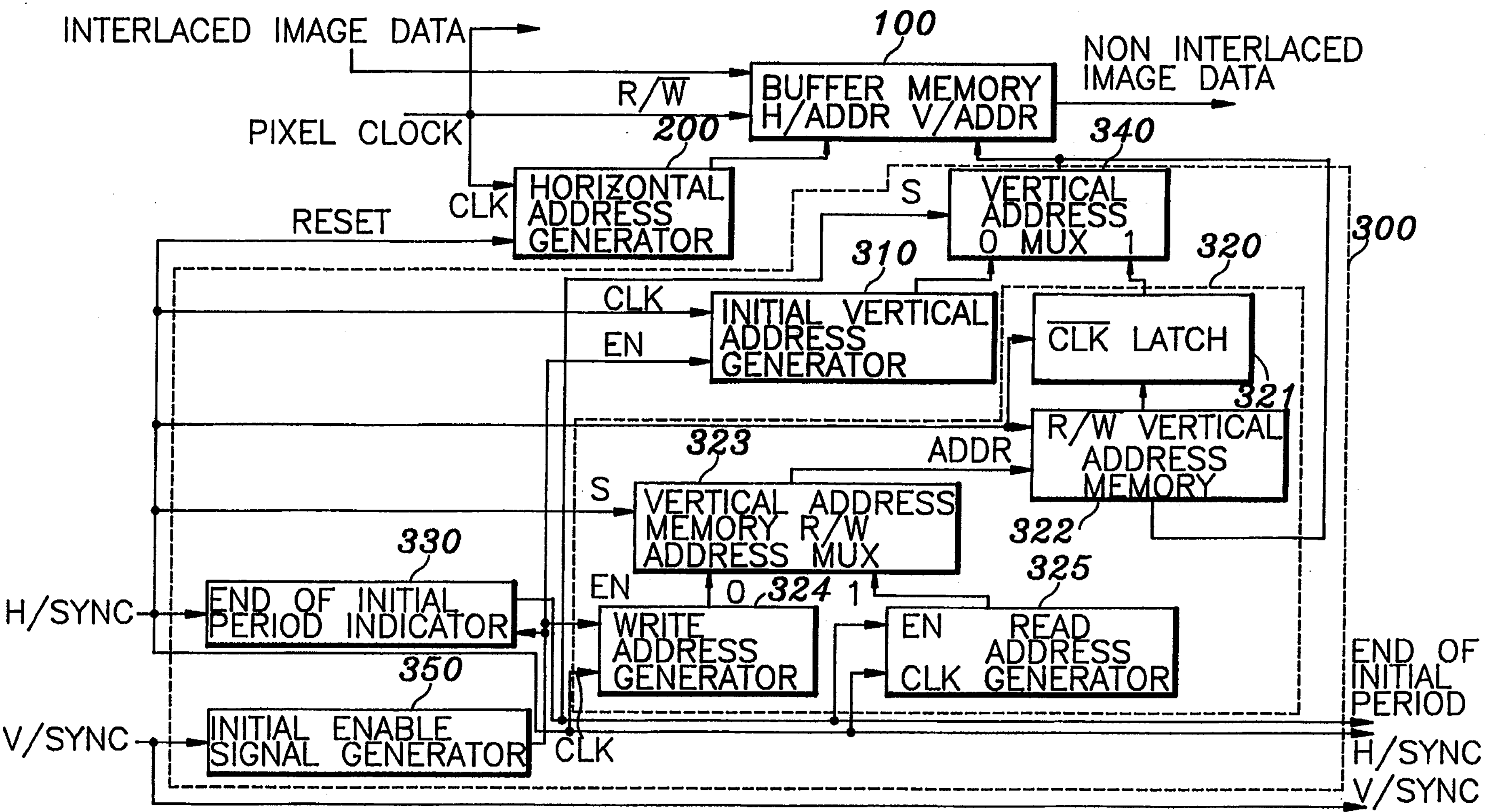
FIG. 2 depicts a block diagram illustrating the scan converter of the present invention.

Referring to FIG. 2, there is illustrated an exemplary image data scan line converter of the present invention, which converts sequentially digitized interlaced input image data from a television camera or other data source to non-interlaced equivalents. (Hereinafter, for the purposes of simplification and illustration only, the exemplary scan converter of the present invention will be described for use with a camera providing eight scan lines per frame or four scan lines per field and 36 pixels per scan line.)

The input signals include image data comprising a digital bit stream defining successive scan lines (i.e., 1,3,5,7,2,4,6,8, . . . , etc.) of the digitized interlaced input image data, pixel clock pulses having a period corresponding to that of the pixels of the input image data, and synchronizing pulses, V/SYNC and H/SYNC, announcing, respectively, the beginnings of each frame and scan line of the input image.

As shown in FIG. 2, the scan converter of the present invention may be divided logically into three parts: a buffer memory 100 for temporarily storing up to four (i.e., the number of scan lines per field) scan lines of the input image data prior to outputting them in a non-interlaced form; a horizontal address generator 200 for generating horizontal addresses for the buffer memory 100; and a vertical address generator 300 for generating vertical addresses for the buffer memory 100.

In this embodiment, the buffer memory 100 is of a two dimensional dual ported memory having a capacity of storing four scan lines of the input image data; and performs, per each pixel clock pulse, a read operation in response to the pixel clock pulse having a "high" logic value, and a write operation in response to the pixel clock pulse base having a "low" logic value, as addressed by a horizontal address from the horizontal address generator 200 and a vertical address from the vertical address generator 300.

The horizontal address generator 200 provides horizontal addresses for the buffer memory 100 by counting the number of pixel clock pulses received after the receipt of each H/SYNC pulse. Specifically, the horizontal address generator 200 will count from 1 to 36 (i.e., the number of pixels per scan line) for each H/SYNC pulse upon receiving 36 successive pixel clock pulses that follow the H/SYNC pulse; and will be reset at 0 upon receiving the next H/SYNC pulse.

The vertical address generator 300, which provides a vertical address for the buffer memory 100 in response to each successive H/SYNC pulse, comprises an initial vertical address generator 310 for generating vertical addresses for the buffer memory 100 during a period from the receipt of the first H/SYNC pulse until before the receipt of the fifth H/SYNC pulse (hereinafter referred to as "initial period"); a subsequent vertical address generator 320 for generating vertical addresses for the buffer memory 100 after the initial period; an initial period end signal generator 330 for detecting the end of the initial period by counting the number of the H/SYNC pulses received, and generating a signal to indicate the end of the initial period having a low logic value during the initial period and a high logic value after the initial period; and a vertical address multiplexor 340 which selects either the vertical addresses from the initial vertical address generator 310 in response to the low logic value of the initial period end signal, or the vertical addresses from the subsequent vertical address generator 320 in response to the high logic value of the initial period end signal. Further, the vertical address generator 300 includes an initial enable signal generator 350 which, in response to the first V/SYNC pulse and before the receipt of the first H/SYNC pulse, provides a signal to enable the initial vertical address generator 310, the initial period end signal generator 330 and a vertical address memory write address generator 324 described hereinlater.

The initial vertical address generator 310, when enabled by the enable signal, provides, by sequentially counting the number of H/SYNC pulses received, first four vertical addresses (i.e., 1,2,3,4) for the buffer memory 100 as selected by the vertical address multiplexor 340 during the initial period.

The subsequent vertical address generator 320, which provides subsequent vertical addresses for the buffer memory 100 after the initial period, comprises a latch 321 which, when clocked by the falling edge of each H/SYNC pulse, latches a vertical address read from a vertical address memory 322; the vertical address memory 322 which outputs, in response to each H/SYNC pulse having a high logic value, the vertical address stored at the vertical address memory location addressed by a vertical address memory read address, and stores, in response to the pulse base of the H/SYNC pulse having a low logic value, the vertical address from the vertical address multiplexor 340 at the vertical address memory location addressed by a vertical address memory write address; a vertical address memory read/write address multiplexor 323 which selects either a vertical address memory read address from a vertical address memory read address generator 325 in response to each H/SYNC pulse, or a vertical address memory write address from a vertical address memory write address generator 324 in response to the pulse base of the H/SYNC pulse; the vertical address memory read address generator 325 which, after enabled by the high logic value of the initial period end signal, functions as a modulo-eight counter to produce eight vertical address memory read addresses in a non-interlaced manner (i.e., 1,2,3,4,5,6,7,8) for each group of eight incoming H/SYNC pulses; and the vertical address memory write address generator 324 which, after enabled by the enable signal from the initial enable signal generator 350, produces eight vertical address memory write addresses in an interlaced manner (i.e., 1,3,5,7,2,4,6,8) for each group of eight incoming H/SYNC pulses.

Figure 3A:
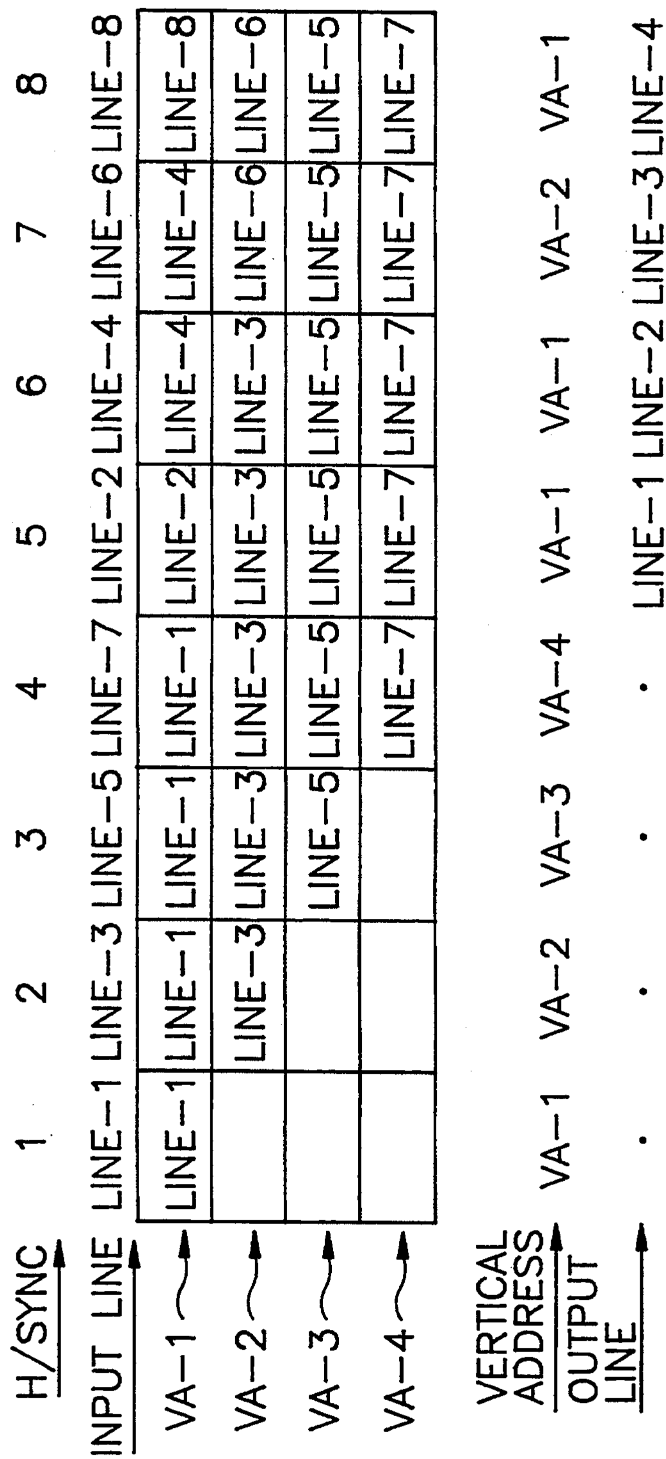
FIGS. 3A and 3B show, respectively, the contents of the buffer memory and the vertical address memory of the scan converter shown in FIG. 2.
Figure 3B:
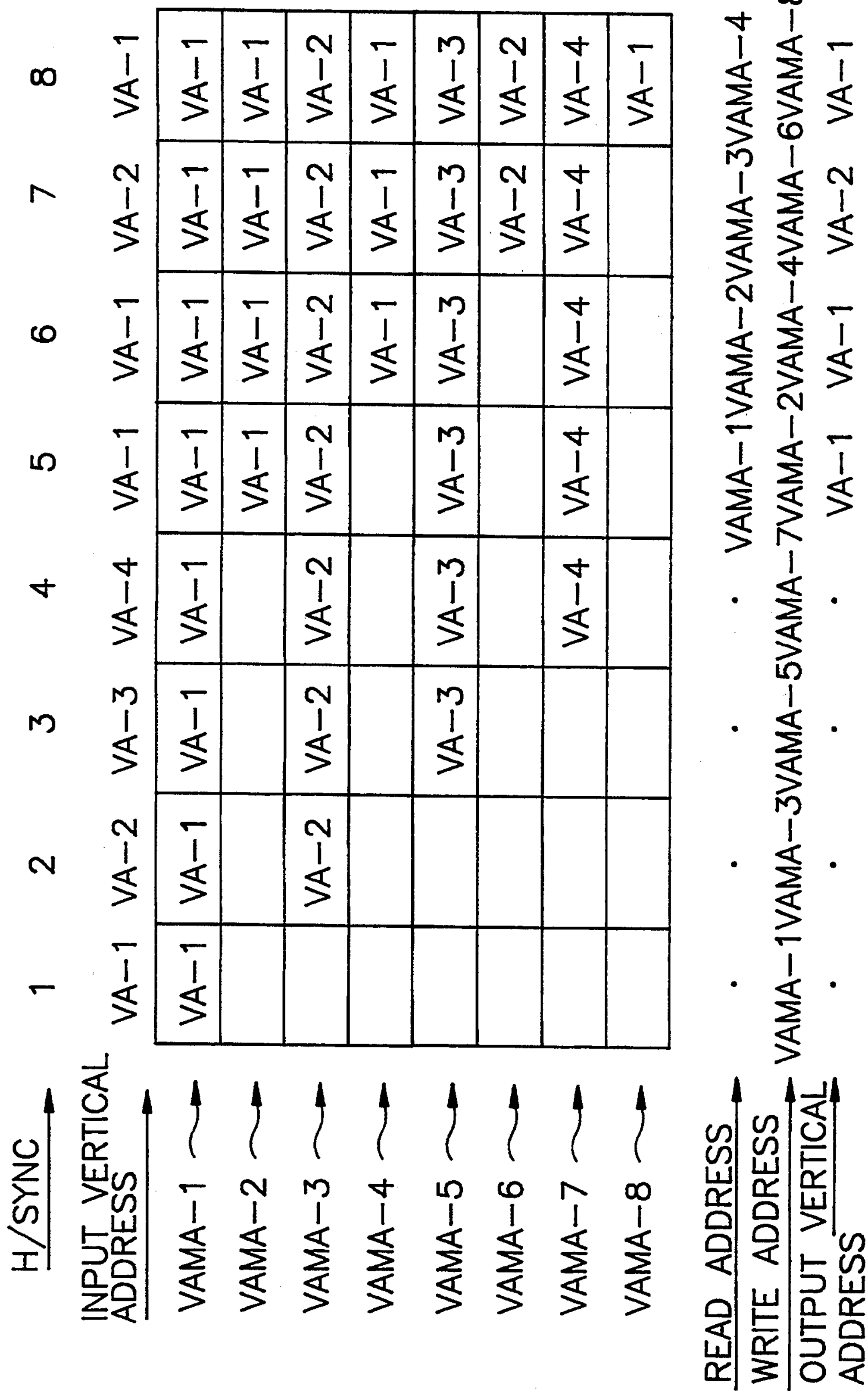

Detailed operation of the scan converter may be best understood with reference to FIGS. 3A and 3B, which, respectively, illustrate the contents of the buffer memory 100 and the vertical address memory 322 in accordance with the H/SYNC pulses fed into the scan converter. Hereinafter, the operation of the scan converter will be described with reference to FIGS. 2, 3A and 3B wherein "LINE-L" stands for the Lth line within a frame of the input image data, and "VA-N" represents the vertical address N of the buffer memory, and "VAMA-M" represents the address M of the vertical address memory address M. (At this point, it is to be reminded that the input image data are fed into the buffer memory 100 line by line in an interlaced form (i.e., LINE-1,3,5,7,2,4,6,8,1,3, . . . , etc.). In addition it is to be noted that although the buffer memory 100 performs a read and a write operations per every pixel clock pulse as described above, the buffer memory 100 contains no meaningful data to be read during the initial period, i.e., before the conversion starts, and, therefore, the receiving digital image processor(not shown) ignores the output data during the initial period as indicated by the low state of the initial period end signal, and, therefore, the read operations of the buffer memory 100 during the initial period will not be considered. Further, it is also to be noted that although the vertical address memory 322 performs a read operation in response to each H/SYNC pulse, and a vertical address read from the vertical address memory 322 is latched in response to the falling edge of the H/SYNC pulse to be applied to the vertical address multiplexor 340, the vertical address will be ignored during the initial period as the vertical address multiplexor 340 selects a vertical address from the initial vertical address generator 310 during the initial period with the low state of the initial period end signal, and, therefore, the read operations of the vertical address memory 322 during the initial period will not be considered.)

At first, when the first V/SYNC pulse(not depicted in FIGS. 3A and 3B) is received, the initial enable signal generator 350 provides an enable signal to enable the initial vertical address generator 310, the initial period end signal generator 330 and the vertical address memory write address generator 324.

Thereafter, when the first H/SYNC pulse is fed into the converter followed by a first scan line (LINE-1) of the interlaced input image data, the horizontal address generator 200 is reset to 0, and, then, is made to provide horizontal addresses (1,2,3, . . . , 36) for the buffer memory 100 by counting from 1 to 36 upon receiving 36 successive pixel clock pulses that follow the H/SYNC pulse. Simultaneously, the initial vertical address generator 310 provides, by (sequentially) counting the number of the H/SYNC pulses received (1, at this point), a vertical address (VA-1) for the buffer memory 100 as selected by the vertical address multiplexor 340 with the low state of the initial period end signal. Thus, the first scan line (LINE-1) can be effectively stored at the buffer memory line addressed by the vertical address (VA-1) as shown in the first column of FIG. 3A.

In the meantime, the vertical address (VA-1) which was selected by the vertical address multiplexor 340 is stored in the vertical address memory 322 for later use. Specifically, when the first H/SYNC pulse is inputted, the vertical address memory write address generator 324 provides a vertical address memory write address in an interlaced manner (i.e., in the sequence corresponding to the sequence of the incoming lines, i.e., 1,3,5,7,2, , etc.). As a result, a vertical address memory write address (VAMA-1) will be provided to the vertical address memory 322 as selected by the vertical address memory read/write address multiplexor 323 with the pulse base of the H/SYNC pulse. Thus, in response to the pulse base of the H/SYNC pulse, the vertical address memory 322 will store the vertical address (VA-1) at the location addressed by the vertical address memory write address (VAMA-1) as shown in the first column of FIG. 3B.

Likewise, when the second H/SYNC pulse is fed into the converter followed by a second scan line (LINE-3) of the interlaced input image data, the horizontal address generator 200 is reset to 0, and, then, is made to provide horizontal addresses (1,2,3, ,36) for the buffer memory 100 by counting from 1 to 36 upon receiving 36 successive pixel clock pulses that follow the H/SYNC pulse. Simultaneously, the initial vertical address generator 310 provides, by (sequentially) counting the number of the H/SYNC pulses received (2, at this point), a vertical address (VA-2) for the buffer memory 100 as selected by the vertical address multiplexor 340 with the low state of the initial period end signal. Thus, the second scan line (LINE-3) can be effectively stored at the buffer memory line addressed by the vertical address (VA-2) as shown in the second column of FIG. 3A.

In the meantime, the vertical address (VA-2) which was selected by the vertical address multiplexor 340 is stored in the vertical address memory 322 for later use. Specifically, when the second H/SYNC pulse is inputted, the vertical address memory write address generator 324 provides a vertical address memory write address in the interlaced manner. As a result, a vertical address memory write address (VAMA-3) will be provided to the vertical address memory 322 as selected by the vertical address memory read/write address multiplexor 323 with the pulse base of the H/SYNC pulse. Thus, in response to the pulse base of the H/SYNC pulse, the vertical address memory 322 will store the vertical address (VA-2) at the location addressed by the vertical address memory write address (VAMA-3) as shown in the second column of FIG. 3B.

In the same manner, during the initial period, the third and the fourth scan lines (LINE-5,7) will be effectively stored in the buffer memory 100 at the buffer memory lines addressed by two vertical addresses (VA-3,4), and the vertical addresses (VA-3,4) will be stored in the vertical address memory 322 at the vertical address memory locations addressed by the vertical address memory write addresses (VAMA-5,7) as shown in the third and the fourth columns of FIGS. 3A and 3B.

Hereinafter, the conversion operation of the present invention will be described. As noted above, the vertical address memory 322 stores the buffer memory vertical addresses of the stored lines at the locations corresponding to the line numbers of the stored lines. Thus, when the vertical address memory is addressed in a non-interlaced manner to get the buffer memory vertical address of the corresponding stored lines, the stored lines can be accessed in the non-interlaced manner as will be described hereinbelow.

After the initial period, when the fifth H/SYNC pulse is fed into the converter followed by a fifth scan line (LINE-2) of the interlaced input image data, the horizontal address generator 200 returns to 0, and, then, is made to provide horizontal addresses (1,2,3, . . . , 36) for the buffer memory 100 by counting from 1 to 36 upon receiving 36 successive pixel clock pulses that follow the H/SYNC pulse.

However, after the initial period, the subsequent vertical address generator 320, instead of the initial vertical address generator 310, will provide a vertical address for the buffer memory 100. Specifically, when the fifth H/SYNC pulse is received, the initial period end signal generator 330 will generate the high state initial period end signal. Thus, the vertical address multiplexor 340 will choose the vertical address provided by the subsequent vertical address generator 320 in a manner described hereinbelow.

The vertical address memory read address generator 325, after enabled by the high state of the initial period end signal and in response to the fifth H/SYNC pulse, will provide a vertical address memory read address in a non-interlaced manner (i.e., 1,2,3,4,5,6,7,8,1,2, . . . , etc.). As a result, a vertical address memory read address (VAMA-1) will be provided to the vertical address memory 322 as selected by the vertical address memory read/write address multiplexor 323 with the H/SYNC pulse. Further, in response to the fifth H/SYNC pulse, the vertical address memory 322 will operate in read mode to read out the vertical address (VA-1) stored at the location addressed by the vertical address memory read address (VAMA-1) as shown in the fifth column of FIG. 3B. Thereafter, when the fifth H/SYNC pulse falls low, the vertical address (VA-1) will be latched at the latch 321 to be applied to the buffer memory 100 through the vertical address multiplexor 340.

As a result, the buffer memory will, in response to successive pixel clock pulses and pulse bases that follow the fifth H/SYNC pulse, output the first scan line (LINE-1) of the input image data and also input the fifth scan line (LINE-2) of the input image data, as addressed by the vertical address (VA-1), as shown in the fifth column of FIG. 3A.

In the meantime, the vertical address (VA-1) which was selected by the vertical address multiplexor 340 will be stored again in the vertical address memory 322 for later use. Specifically, when the fifth H/SYNC pulse is inputted, the vertical address memory write address generator 324 provides a vertical address memory write address in the interlaced manner. As a result, a vertical address memory write address (VAMA-2) will be provided to the vertical address memory 322 as selected by the vertical address memory read/write address multiplexor 323 with the pulse base of the H/SYNC pulse. Thus, in response to the pulse base of the H/SYNC pulse, the vertical address memory 322 will store the vertical address (VA-1) at the location specified by the vertical address memory write address (VAMA-2) as shown in the fifth column of FIG. 3B.

Thereafter, when the sixth H/SYNC pulse is fed into the converter followed by a sixth scan line (LINE-4) of the interlaced input image data, the horizontal address generator 200 is reset to 0, and, then, is made to provide horizontal addresses (1,2,3, . . . , 36) for the buffer memory 100 by counting from 1 to 36 upon receiving 36 successive pixel clock pulses that follow the H/SYNC pulse. Simultaneously, the subsequent vertical address generator 320 provides a vertical address for the buffer memory 100 as selected by the vertical address multiplexor 340 with the high state of the initial period end signal. Specifically, the vertical address read address generator 325, after enabled by the high state of the initial period end signal and in response to the sixth H/SYNC pulse, provides a vertical address memory read address in the non-interlaced manner. As a result, a vertical address memory read address (VAMA-2) will be provided to the vertical address memory 322 as selected by the vertical address memory read/write address multiplexor 323 with the H/SYNC pulse. Further, in response to the sixth H/SYNC pulse, the vertical address memory 322 will operate in read mode to read out the vertical address (VA-1) stored at the location addressed by the vertical address memory read address (VAMA-2) as shown in the sixth column of FIG. 3B. Thereafter, when the sixth H/SYNC pulse falls low, the vertical address (VA-1) will be latched at the latch 321 and then transferred to the buffer memory 100 through the vertical address multiplexor 340. As a result, the buffer memory will, in response to successive pixel clock pulses and pulse bases that follow the sixth H/SYNC pulse, output the fifth scan line (LINE-2) of the input image data and also input the sixth scan line (LINE-4) of the input image, as addressed by the vertical address (VA1), as shown by the sixth column of FIG. 3A.

In the meantime, the vertical address (VA-1) which was selected by the vertical address multiplexor 340 will also be stored in the vertical address memory 322 for later use. Specifically, when the sixth H/SYNC pulse is inputted, the vertical address memory write address generator 324 provides a vertical address memory write address in the interlaced manner. As a result, a vertical address memory write address (VAMA-4) will be provided to the vertical address memory 322 as selected by the vertical address memory read/write address multiplexor 323 with the pulse base of the H/SYNC pulse. Thus, in response to the pulse base of the sixth H/SYNC pulse, the vertical address memory 322 will store the vertical address (VA-1) at the location addressed by the vertical address memory write address (VAMA-4) as shown in the sixth column of FIG. 3B.

Thereafter, when the seventh H/SYNC pulse is fed into the converter followed by a seventh scan line (LINE-6) of the interlaced input image data, the horizontal address generator 200 is reset to 0, and, then, is made to provide horizontal addresses (1,2,3, . . . , 36) for the buffer memory 100 by counting from 1 to 36 upon receiving 36 successive pixel clock pulses that follow the H/SYNC pulse. Simultaneously, the subsequent vertical address generator 320 provides a vertical address for the buffer memory 100 as selected by the vertical address multiplexor 340 with the high state of the initial period end signal. Specifically, the vertical address read address generator 325, after enabled by the high state of the initial period end signal and in response to the seventh H/SYNC pulse, provides a vertical address memory read address in the non-interlaced manner. As a result, a vertical address memory read address (VAMA-3) will be provided to the vertical address memory 322 as selected by the vertical address memory read/write address multiplexor 323 with the H/SYNC pulse. Further, in response to the seventh H/SYNC pulse, the vertical address memory 322 will operate in read mode to read out the vertical address (VA-2) stored at the location addressed by the vertical address memory read address (VAMA-3) as shown in the seventh column of FIG. 3B. Thereafter, when the seventh H/SYNC pulse falls low, the vertical address (VA-2) will be latched at the latch 321 and then transferred to the buffer memory 100 through the vertical address multiplexor 340. As a result, the buffer memory will, in response to successive pixel clock pulses and pulse bases that follow the seventh H/SYNC pulse, output the second scan line (LINE-3) of the input image data and also input the seventh scan line (LINE-6) of the input image, as addressed by the vertical address (VA-2), as shown in the seventh column of FIG. 3A.

In the meantime, the vertical address (VA-2) which was selected by the vertical address multiplexor 340 will also be stored in the vertical address memory 322 for later use. Specifically, when the seventh H/SYNC pulse is inputted, the vertical address memory write address generator 324 provides a vertical address memory write address in the interlaced manner. As a result, a vertical address memory write address (VAMA-6) will be provided to the vertical address memory 322 as selected by the vertical address memory read/write address multiplexor 323 with the pulse base of the H/SYNC pulse. Thus, in response to the pulse base of the H/SYNC pulse, the vertical address (VA-2) will be stored in the vertical address memory 322 at the location addressed by the vertical address memory write address (VAMA-6) as shown in the seventh column of FIG. 3B.

The operation of the scan converter for each of the remaining successive H/SYNC pulses (i.e., 8th, 9th, . . .

, etc.) is substantially identical to that described with regard to the fifth and the sixth H/SYNC pulses, and, therefore, will not be explained further. However, those skilled in the art can easily grasp the logic flow of the scan converter for the remaining H/SYNC pulses.

In short, in accordance with the present invention, after the storage of each incoming line, the vertical address memory 322 stores the buffer memory vertical address of the stored line at the location having an address that corresponds to the line number of the stored line. Thus, once the buffer memory is filled up with half a frame of the input image data, the stored lines can be accessed in a non-interlaced manner through addressing the vertical address memory in the non-interlaced manner, as is described above.

Consequently, in accordance with the present invention, digitized interlaced image data can be converted into a non-interlaced form with a buffer memory having a capacity of storing only half a frame of the image data, an extra storage space capable of storing all the vertical addresses of a frame and some supporting circuitry.

While the present invention has been shown and described with reference to the particular embodiments, it will be apparent to those skilled in the art that many changes and modifications may be made without departing from the spirit and scope of the invention as defined in the appended claims.

What is claimed is:

1. A data converter supplied with successive scan lines of interlaced image data, pixel clock pulses and H/SYNC pulses for converting said interlaced image data in a non-interlaced format, said interlaced image data including a plurality of successive frames, each of the frames having an odd field followed by an even field, each of said scan lines including a predetermined number of pixels, said pixel clock pulses having a period corresponding to that of the pixels, each of said H/SYNC pulses announcing the beginning of the corresponding scan line of said interlaced image data, said converter comprising:

a two-dimensional buffer memory capable of storing up to N of said successive scan lines of said interlaced image data for performing, per pixel clock pulse, a read and then a write operation, wherein said N represents the number of scan lines per field;

a horizontal address generator for, upon receiving each of said pixel clock pulses, generating a horizontal address for the buffer memory by sequentially counting the number of pixel clock pulses received after each of said H/SYNC pulses received;

an initial vertical address generator for generating, during an initial period from the receipt of the first of said H/SYNC pulses until before the receipt of the (N+1)st of said H/SYNC pulses, N vertical addresses sequentially by counting the number of H/SYNC pulses received;

a subsequent vertical address generator for generating, in response to each of said H/SYNC pulses from the receipt of the (N+1)st of said H/SYNC pulses, one of a sequence of vertical addresses for outputting said interlaced image data in the non-interlaced format; and a vertical address selection means for selecting a vertical address for the buffer memory either from the initial vertical address generator during the initial period, or from the subsequent vertical address generator after the receipt of the (N+1)st of said H/SYNC pulses.

2. The data converter of claim 1, wherein said subsequent vertical address generator includes:

a one-dimensional vertical address memory which, per H/SYNC pulse, reads out a vertical address stored in the one-dimensional vertical address memory and then stores therein a vertical address from the vertical address selection means;

a vertical address memory read address generator which, in response to each of said H/SYNC pulses from the receipt of the (N+1)st of said H/SYNC pulses, produces a vertical address memory address in a non-interlaced manner;

a vertical address memory write address generator which, in response to each of said H/SYNC pulses from the receipt of the first of said H/SYNC pulses, produces s vertical address memory address in a interlaced manner; and a vertical address memory address selection means for selecting a vertical address memory address either from the vertical address memory read address generator in response to a first state of each of said H/SYNC pulses, or from the vertical address memory write address generator in response to a second state of each of said H/SYNC pulses.

* * * * *